J. McDONALD.
MINING MACHINE.
APPLICATION FILED MAR. 14, 1911.
1,052,359.
Patented Feb. 4, 1913.
5 SHEETS—SHEET 1.
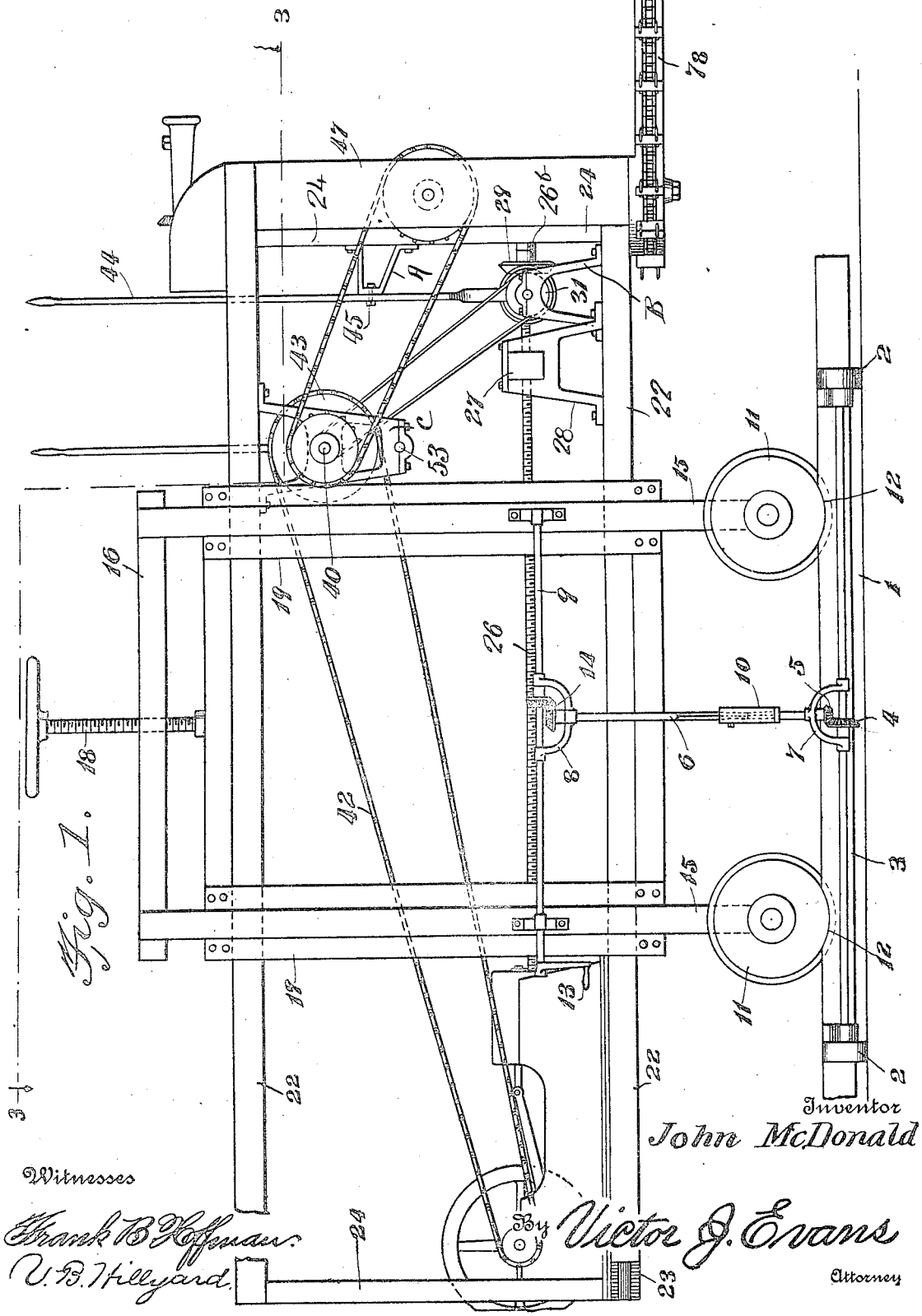
Witnesses
Frank B. Hoffman
U. B. Hillyard
Inventor
John McDonald
By Victor J. Evans
Attorney

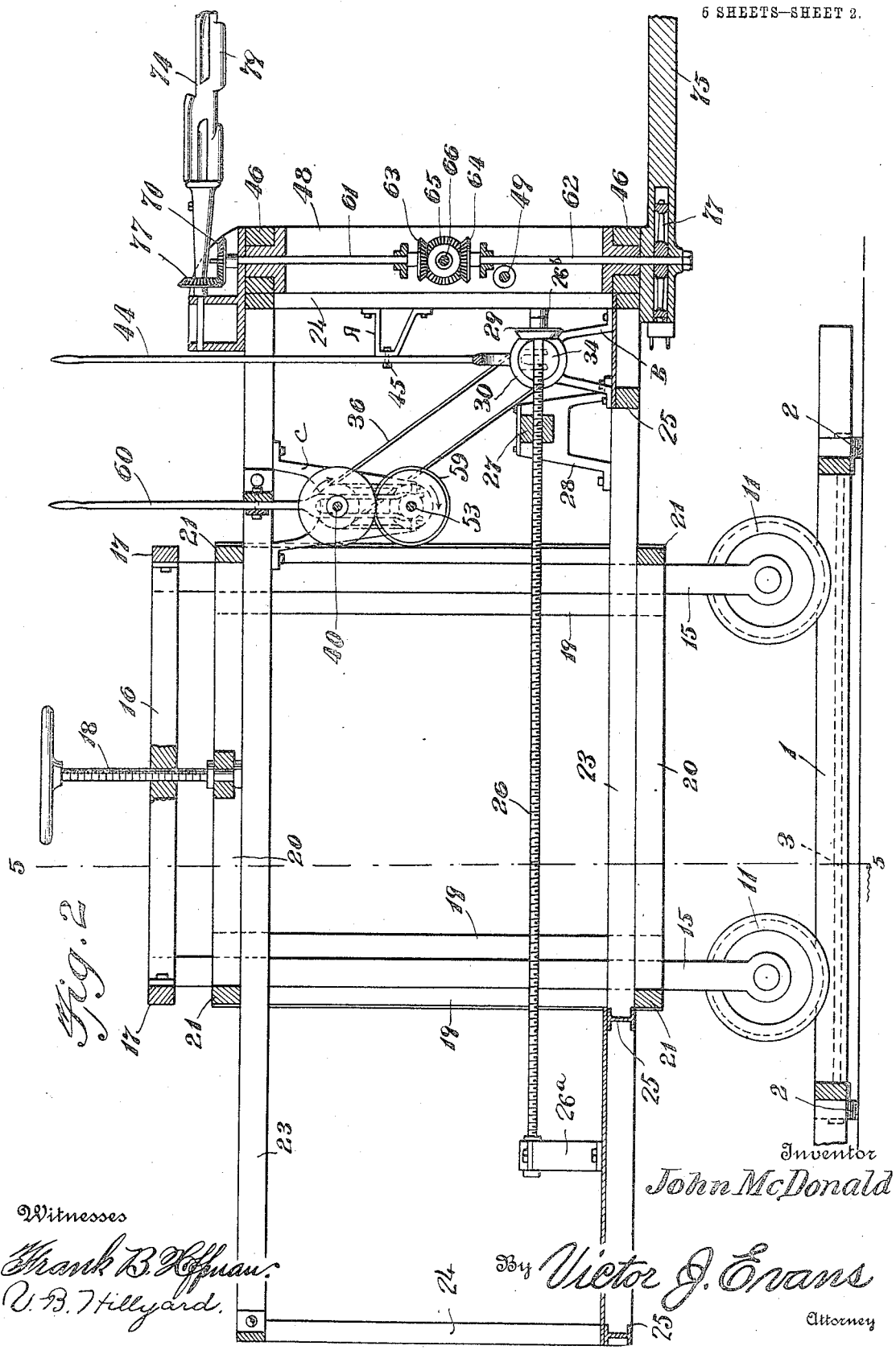

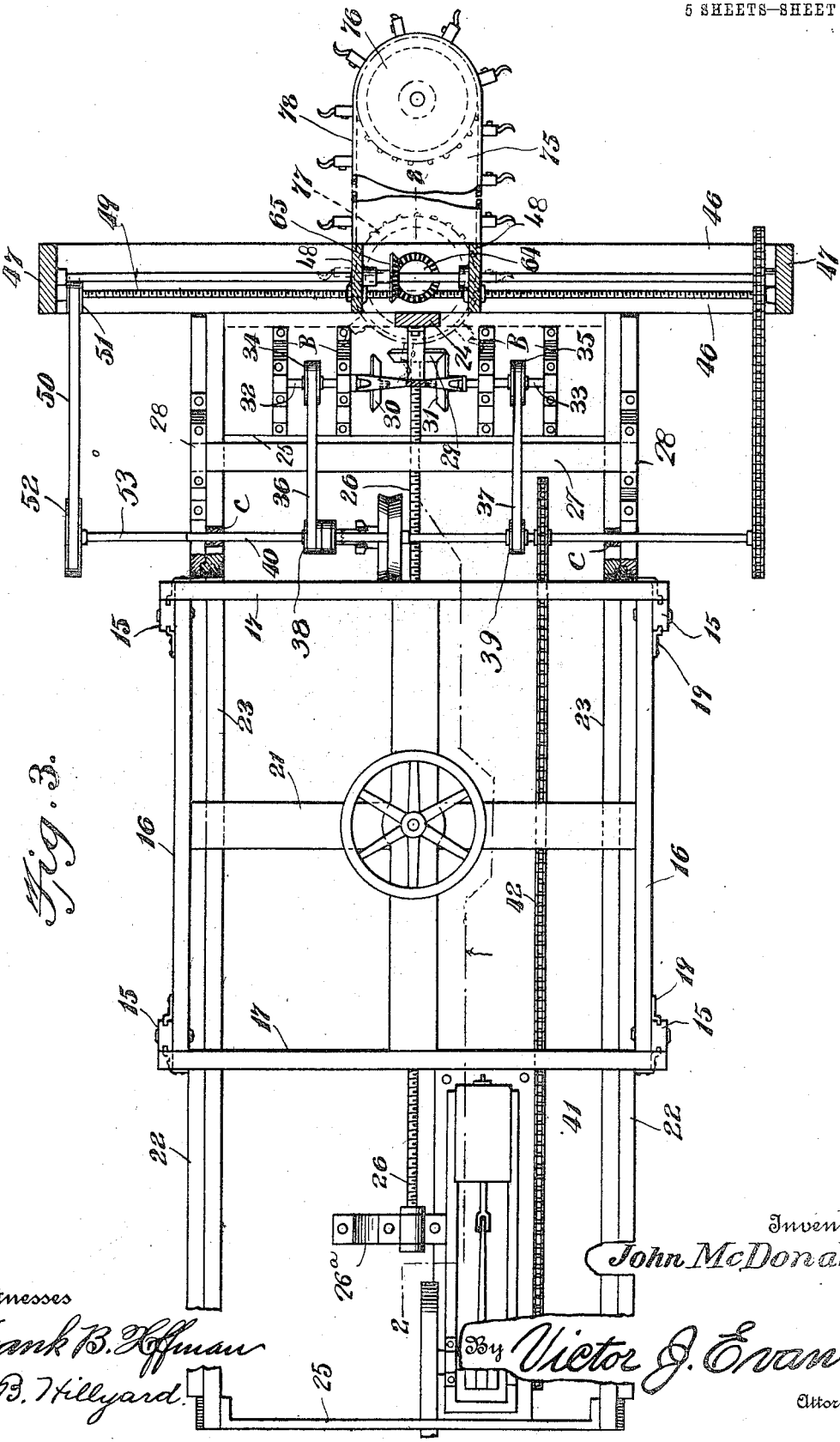

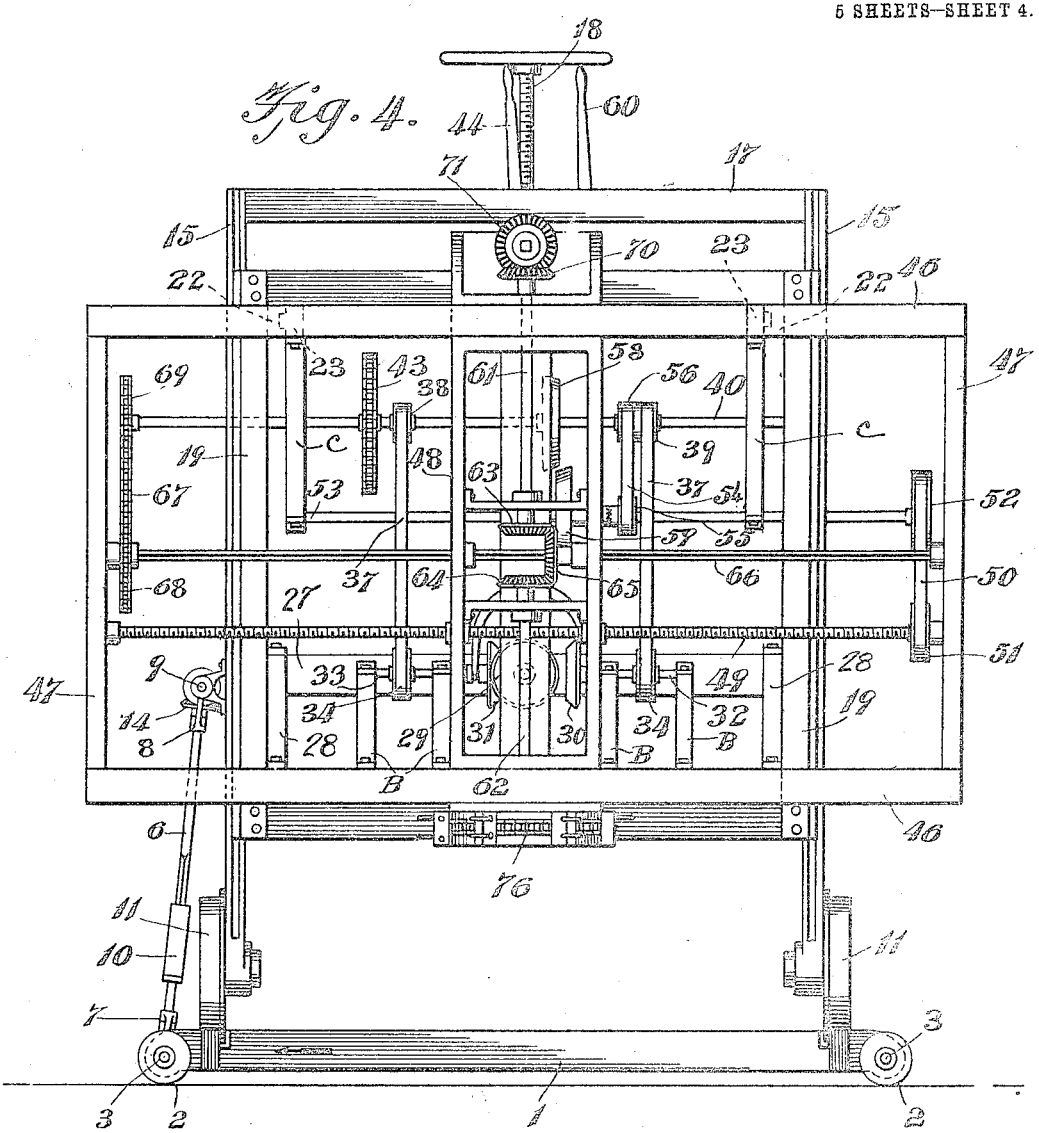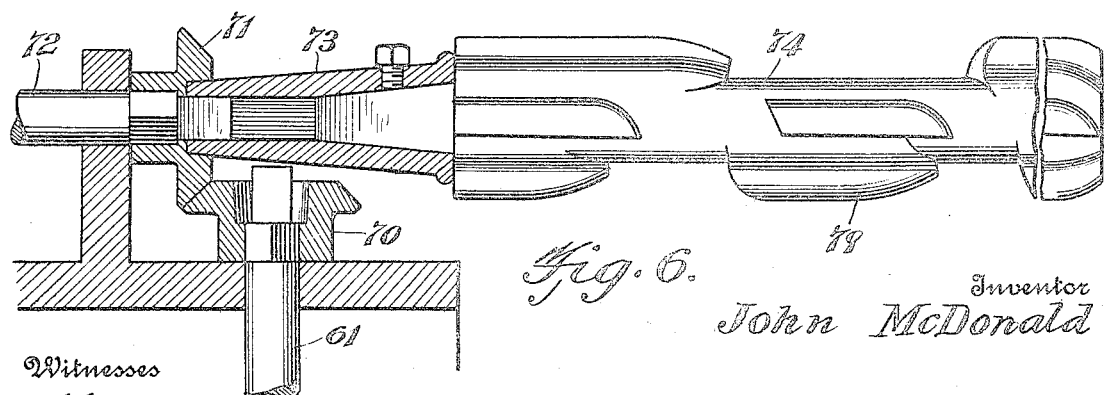

J. McDONALD.
MINING MACHINE.
APPLICATION FILED MAR. 14, 1911.
1,052,359.
Patented Feb. 4, 1913.
5 SHEETS—SHEET 5.
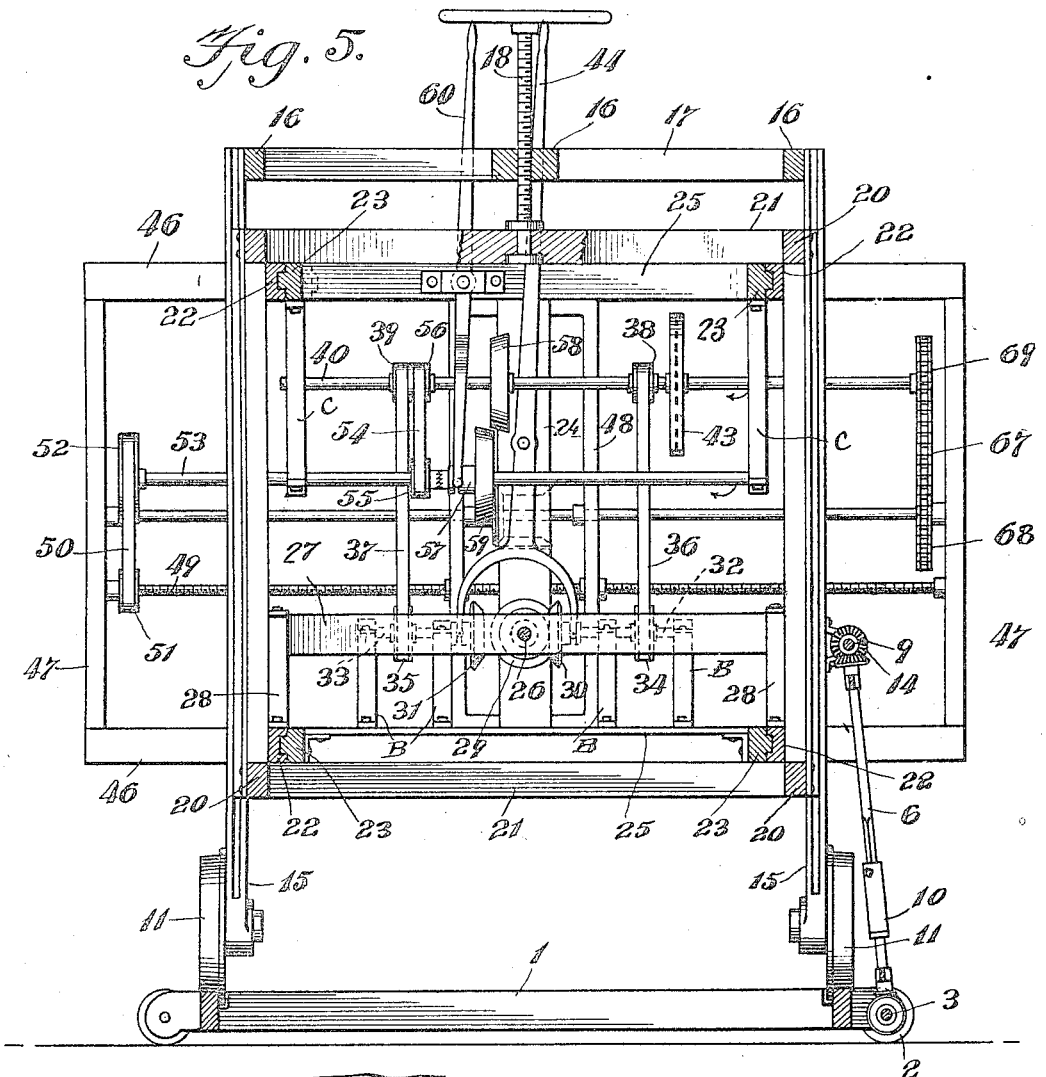
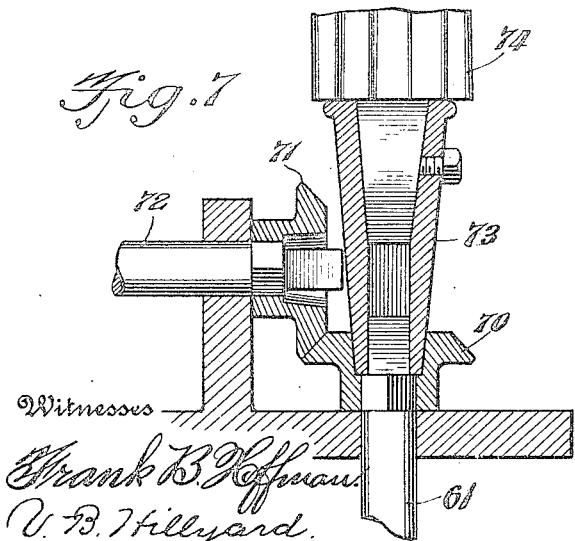
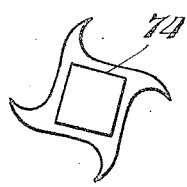
Witnesses
Frank B. Hoffman
V. B. Hillyard
Inventor
John McDonald
By Victor J. Evans
Attorney

UNITED STATES PATENT OFFICE.

JOHN McDONALD, OF SILVER CREEK, NEW PHILADELPHIA, PENNSYLVANIA.

MINING-MACHINE.

1,052,359.  Specification of Letters Patent.  Patented Feb. 4, 1913.

Application filed March 14, 1911. Serial No. 614,417.

*To all whom it may concern:*

Be it known that I, JOHN McDONALD, a citizen of the United States, residing at Silver Creek, New Philadelphia, in the county of Schuylkill and State of Pennsylvania, have invented new and useful Improvements in Mining-Machines, of which the following is a specification.

The present invention provides a machine designed most especially for mining coal, but which may be advantageously employed in mining operations generally where it is desirable to form cuts in the bed of the material to be mined.

The invention relates most especially to mining machinery designed for making cuts in the strata or bed of the substance to be mined, thereby enabling the ready removal of the same to be prepared for market.

The improvement relates to a machine which is adapted both for cutting and boring into the material, said machine embodying independent frame structures which admit of a variety of adjustments so that while the main framework is braced in the usual manner the auxiliary frames may be adjusted to admit of properly positioning the cutting or boring mechanism, feeding said cutting mechanisms forwardly and subsequently moving the cutting mechanism to form a straight cut so as to bodily separate the material to be mined.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a mining machine of special construction embodying the invention. Fig. 2 is a vertical longitudinal section thereof about on the line 2—2 of Fig. 3. Fig. 3 is a horizontal section on the line 3—3 of Fig. 1. Fig. 4 is a front view of the machine. Fig. 5 is a vertical transverse section on the line 5—5 of Fig. 2. Fig. 6 is a side view of the boring tool and the means for receiving the same. Fig. 7 is a detail view of the parts shown in Fig. 6, the boring tool being moved into vertical position. Fig. 8 is a rear end view of the boring tool.

Corresponding and like parts are referred to in the following description, and indicated in all the views of the drawings, by the same reference characters.

The machine when in operation is preferably mounted upon a truck 1, the same comprising longitudinal and transverse bars arranged to form a substantial frame of approximately rectangular form mounted upon supporting wheels 2. A shaft 3 mounted in bearings forming a part of or attached to the truck frame has two of the supporting wheels 2 secured thereto. A bevel gear 4 is attached to the shaft 3 so as to rotate therewith and meshes with a bevel pinion 5 secured to the lower end of a sectional shaft 6, which is journaled near its lower end in a frame 7 mounted upon the shaft 3 and near its upper end in a frame 8 mounted upon a shaft 9. A sleeve 10 connects the adjacent ends of the sections comprising the shaft 6. When the machine is to be disconnected from the truck the sleeve 10 is slipped upon one of the sections of the shaft 6 and made fast thereto. The beams of the truck frame adapted to receive the wheels 11 of the main frame of the machine have depressions 12 in their upper sides to receive the wheels 11 when the machine is in proper position upon the truck, thereby preventing casual displacement of the machine. The shaft 9 is mounted in bearings fitted to uprights of the main frame and has an operating crank 13 at one end. Bevel gearing 14 connects the two shafts 6 and 9. When the machine is in position upon the truck the latter may be moved laterally by operating the crank 13, which rotates the shaft 9, said motion being communicated to the shaft 6 through the gearing 14 and transmitted to the shaft 3 through the gearing 4 and 5, thereby positively rotating the wheels 2 secured to said shaft 3.

The main frame comprises uprights 15, longitudinal beams 16 and transverse beams 17 and is mounted upon wheels 11 which are constructed to travel upon the usual tracks. The intermediate longitudinal beam receives a feed screw 18, which is vertically arranged and provided at its upper end with a hand wheel. The lower end of the feed screw 18 is connected by means of a swivel joint with a supplemental frame which is adjustable vertically and supports the engine and operating mechanism. The supplementary frame comprises spaced uprights 19, longitudinal beams 20 and transverse connecting beams 21. The upper intermediate transverse beam 21 has the lower end of the feed screw 18 connected thereto. Longitudinal beams 22 are connected to the uprights of the supplemental frame and project in front and in the rear thereof some distance. The vertically movable frame supports a longitudinally movable frame which carries the engine and operating parts. The longitudinally movable frame embodies longitudinal beams 23 which are connected by means of uprights 24 and transverse ties 25. As shown most clearly in Fig. 5 the beams 23 are arranged upon the inner sides of the beams 22 and have interlocking connection therewith by means of a tongue and groove joint. A feed screw 26 is mounted at its ends in bearings 26$^a$ and 26$^b$ provided upon the longitudinally movable frame and has screw-thread connection with a transverse beam 27 supported by standards 28 secured to the longitudinal beams 22. As the feed screw 26 is rotated the longitudinally movable frame is positively propelled in the direction of its length either forwardly or rearwardly according to the direction of rotation of the said feed screw. When the frame is moved forwardly the cutting mechanism is advanced into the bed of the material to be mined and when said frame is moved rearwardly the cutting mechanism is withdrawn from the cut or opening. A bevel wheel 29 is made fast to the feed screw 26 and is adapted to be engaged by bevel wheels 30 and 31 secured to shafts 32 and 33, which are mounted in brackets B secured to the forward transverse ties 25 between the longitudinal beams 23. Belt pulleys 34 and 35 are secured to the respective shafts 32 and 33 and drive belts 36 and 37 connect said belt pulleys to corresponding belt pulleys 38 and 39 fastened to a transverse shaft 40 mounted in brackets C secured to the longitudinal beams 23. The shaft 40 is positively driven from the engine 41, which is mounted upon the longitudinally movable frame by means of a sprocket chain 42, which passes around a sprocket wheel secured to the engine shaft and around a sprocket wheel 43 mounted upon the shaft 40. The bevel wheels 30 and 31 are adapted to be thrown into and out of engagement with the bevel wheel 29 so as to rotate the feed screw 26 either to the right or to the left, accordingly as it may be required to advance or retract the longitudinally movable frame and the cutting mechanism carried thereby. A shipper lever 44 is fulcrumed at 45 to a bracket A attached to an upright 24 and its lower end is forked, the fork members engaging the bevel wheels 30 and 31 so as to move the same simultaneously, thereby preventing both bevel wheels 30 and 31 engaging the bevel wheel 29 at the same time. It is to be understood that when the lever 44 is moved to a neutral position both bevel wheels 30 and 31 are disengaged from the bevel wheel 29, thereby admitting of the longitudinally movable frame remaining stationary.

A transverse frame is had at the outer or forward end of the longitudinally movable frame and comprises upper and lower cross beams 46 and uprights 47. The cross beams 46 are longitudinally slotted to receive the upper and lower ends of a transversely movable frame 48, which carries the cutting mechanism. The transversely movable frame 48 comprises spaced uprights which have their end portions reduced, as indicated most clearly in Fig. 2, and passing through the slots of the cross beams 46. A feed screw 49 is mounted in bearings applied to the uprights 47 and has screwthread connection with the uprights of the frame 48. Rotation of the feed screw 49 effects a lateral movement of the frame 48 and the cutting mechanism carried thereby. A drive belt 50 connects a drive pulley 51 secured to the feed screw 49 with a drive pulley 52 fastened to a transverse shaft 53. A drive belt 54 connects a drive pulley 55 loose upon the shaft 53 with a drive pulley 56 fastened to the shaft 40. A clutch sleeve 57 keyed to the shaft 53 and movable thereon is adapted to be thrown into engagement with the drive pulley 55 and thereby cause rotation of the shaft 53 in one direction so as to move the frame 48 laterally in one direction. A friction wheel 58 secured to the shaft 40 is adapted to engage a friction wheel 59 loose upon the shaft 53 and secured to the clutch sleeve 57. When the friction wheels 58 and 59 are in engagement the shaft 53 is rotated in the opposite direction, thereby turning the feed screw 49 in a reverse direction to move the frame 48 laterally in the opposite direction. When the friction wheels 58 and 59 are in engagement the clutch sleeve 57 is disengaged from the drive pulley 55. The clutch sleeve 57 may be moved to a position so as to throw both the drive pulley 55 and the friction wheel 59 out of action, thereby admitting of the frame 48 remaining stationary. A shipper lever 60 is mounted upon a cross beam 25 of the longitudinal frame and engages the clutch sleeve 57 to enable convenient movement thereof.

Two shafts 61 and 62 are mounted vertically in the frame 48 and their inner ends have bevel gears 63 and 64 which are in mesh with a bevel gear 65 loose upon a transverse shaft 66, which parallels the feed screw 49 and is journaled at its ends in the end uprights 47 of the transverse frame. The bevel gear 65 has a feather and spline connection with the shaft 66 so as to rotate therewith and is movable with the frame 48. A sprocket chain 67 connects a sprocket wheel 68 fastened to the shaft 66 with a sprocket wheel 69 fastened to the shaft 40. It will thus be understood that the shaft 66 is connected directly to the power driven shaft 40 and is driven at all times when the machine is in operation to actuate the cutting mechanism. A bevel gear 70 is secured to the upper end of the shaft 61 and meshes with a bevel gear 71 fastened to the outer end of a longitudinal shaft 72. A tool holder 73 is adapted to be fitted to the end of either one of the shafts 61 or 72, as indicated most clearly in Figs. 6 and 7. When the tool holder 73 is fitted to the shaft 72 the boring tool 74 is adapted to operate horizontally, but when the tool holder is fitted to the shaft 61, as indicated in Fig. 7, the boring tool 74 is adapted to operate vertically. When the cutter is of the boring type the frame 48 is stationary with reference to any lateral movement, but is advanced either longitudinally or vertically accordingly as the bore is to be formed in the wall or the roof of the drift or passage being mined.

The horizontal cutter for forming a transverse cut in the bed of the material or substance to be mined is attached to the lower end of the frame 48 and comprises a frame 75, which is provided at its outer end with a pulley 76 and at its inner end with a pulley 77, an endless cutter chain 78 being supported upon the pulleys. The pulley 77 is secured to the lower end of the vertical shaft 62 so as to rotate therewith. The straight cutter is advanced into the bed of the material by the forward movement of the longitudinally movable frame, after which the frame 48 is moved laterally to cause the cutter to form a horizontal cut and when the frame 48 reaches the limit of its movement the cut if desired may be extended by returning the frame 48 to the first position and moving the truck frame 1 laterally, after which the machine may again be started. It is to be understood that the frame 48 may be adjusted to occupy a central position when advancing the cutter 78 into the bed of the material to be mined, so that the horizontal cut may be formed each way from a middle point.

The boring tool 74 may be of any construction, but it is preferred to have the same consist of a body studded upon its sides with wings 79 which have an approximate longitudinal arrangement, said wings being hollow upon one side and convex upon the opposite side and having their front ends curved and sharpened. The wings 79 are preferably arranged in straight lines and are spaced apart, the wings in one line being arranged to break joint with the wings in the adjacent lines. The spaces between the wings provide clearance for the cuttings, thereby preventing the boring tool becoming choked in the opening and enabling it to clear itself of the cuttings. The wings at the forward end of the tool approach and touch a plane passing at a right angle to the axis of the tool.

In the operation of the machine the same is run to the required place of use upon the usual tracks and when the room, passage or drift is reached the machine is lifted from the main track and placed upon the truck 1 by means of which it is moved into proper position, the truck being operated by means of the shaft 9 and the intermediate connections. After the machine has been properly positioned it is braced from the roof and walls of the room or mine in the accustomed way. The supplemental frame is adjusted vertically to bring the cutting mechanism to the required elevation, this result being effected by means of the feed screw 18. If the opening is to be formed in the roof of the mine by means of the boring tool 74 the latter is fitted to the vertical shaft 61, as indicated in Fig. 7, the tool being advanced by the vertical movement of the supplemental frame. After the cutting mechanism has been positioned it is advanced into the bed of the material by the longitudinal movement of the frame provided with the feed screw 26, the lever 44 being operated to throw the proper gear wheel 30 or 31 into engagement with the gear wheel 29. After the cutter has been advanced to the required depth the feed screw 26 is thrown out of action and the cutter is caused to move laterally by proper manipulation of the lever 60 to throw the clutch sleeve 57 into engagement with either the gear wheel 58 or the belt pulley 55. After the cut has reached the desired lateral extent the horizontal movement of the frame 48 is interrupted by operation of the lever 60 and the cutter may be withdrawn by moving the lever 44 to throw the feed screw 26 into gear so as to back the longitudinally movable frame.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination a truck mounted upon wheels, a shaft connecting two of the wheels, a mining machine frame detachably mounted upon the truck, an operating shaft mounted upon the mining machine frame, a frame mounted upon each of the before mentioned shafts, a sectional shaft having its sections mounted in the last mentioned frames, gearing connecting each section of the sectional shaft to the respective shafts of the truck and the mining machine frame, and a coupling detachably connecting the two sections of the shaft.

2. In a mining machine, the combination of a main frame, a supplemental frame, means for moving the supplemental frame vertically upon the main frame, a longitudinally movable frame carried by the vertically movable frame, and a laterally movable frame mounted upon the longitudinally movable frame and provided with the cutting mechanism.

3. In a mining machine, the combination of a main frame, a supplemental frame mounted upon the main frame, means for moving the supplemental frame vertically, a longitudinally movable frame carried by the vertically movable frame and provided with the operating mechanism, means mounted upon said longitudinally movable frame for imparting a forward and a backward movement thereto, a laterally movable frame mounted upon the longitudinally movable frame and provided with the cutting mechanism, and operating means for moving the laterally movable frame.

4. In a mining machine the combination of a supporting frame, a transverse frame carried by the supporting frame, a frame mounted upon the transverse frame to move laterally and provided with the cutting mechanism, a feed screw mounted upon the transverse frame and having screwthread connection with the laterally movable frame, a power driven shaft mounted upon the said supporting frame, an intermediate shaft mounted upon the transverse frame and geared to said feed screw, two sets of gearing between the drive shaft and the intermediate shaft for rotating the latter in opposite directions, and a clutch for throwing one or the other of the two sets of gearing into operation to rotate the feed screw either to the right or to the left according to the direction of movement of the frame provided with the cutting mechanism.

5. In a mining machine the combination of a main frame, a longitudinally movable frame mounted upon said main frame, a feed screw mounted upon the longitudinally movable frame and having screwthread connection with a fixed part of the main frame, a gear fastened to the feed screw, rotatable gears located upon opposite sides of the feed screw, a power driven shaft mounted upon the longitudinally movable frame, power transmitting means between said shaft and the rotatable gears, and means for moving said rotatable gears to throw one or the other into engagement with the gear of the feed screw to effect a reverse rotation thereof to cause a forward or a rearward movement of the said longitudinally movable frame.

6. In a mining machine, the combination of a longitudinally movable frame, a laterally movable frame provided with cutting mechanism, a feed screw for advancing or retracting the longitudinal frame, a feed screw for the laterally movable frame, a drive shaft, an intermediate shaft geared to the feed screw for operating the laterally movable frame, two sets of gearing between the drive shaft and said intermediate shaft including a clutch for throwing one or the other of the sets of gearing into operation, two transversely alining shafts, gearing between the transversely alining shafts and the feed screw for moving the longitudinal frame, gearing between the drive shaft and each of the transversely alining shafts, and means for throwing one or the other of the transversely alining shafts into gear with the feed screw of the longitudinally movable frame.

In testimony whereof I affix my signature in presence of two witnesses.

JOHN McDONALD.

Witnesses:
  J. LINEAWEAVER,
  SAMUEL R. BEARD.